US006840058B2

(12) United States Patent
Suzuki et al.

(10) Patent No.: US 6,840,058 B2
(45) Date of Patent: Jan. 11, 2005

(54) REFRIGERATING CYCLE APPARATUS AND METHOD

(75) Inventors: Masaaki Suzuki, Osaka (JP); Yuji Yoshida, Itami (JP); Fumitoshi Nishiwaki, Nishinomiya (JP); Masami Funakura, Neyagawa (JP); Noriho Okaza, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/204,380

(22) PCT Filed: Dec. 17, 2001

(86) PCT No.: PCT/JP01/11014

§ 371 (c)(1),
(2), (4) Date: Dec. 2, 2002

(87) PCT Pub. No.: WO02/50482

PCT Pub. Date: Jun. 27, 2002

(65) Prior Publication Data

US 2003/0140649 A1 Jul. 31, 2003

(30) Foreign Application Priority Data

Dec. 20, 2000 (JP) .................................... 2000-386625

(51) Int. Cl.[7] .............................. F25B 43/00; F25B 1/00
(52) U.S. Cl. ........................................ 62/474; 62/502
(58) Field of Search ............................. 62/474, 502, 68

(56) References Cited

U.S. PATENT DOCUMENTS

| 4,354,362 | A | * | 10/1982 | Schumacher et al. | .......... 62/474 |
| 4,487,707 | A | * | 12/1984 | Holzknecht | .................. 252/68 |
| 4,637,881 | A | * | 1/1987 | Sciuto | .......................... 210/689 |
| 4,674,297 | A | * | 6/1987 | Vobach | ......................... 62/476 |
| 5,656,578 | A | * | 8/1997 | Tanaka et al. | .............. 508/462 |
| 5,879,581 | A | * | 3/1999 | Ushimaru | ..................... 252/68 |
| 6,268,317 | B1 | * | 7/2001 | Kawakami et al. | ......... 508/305 |
| 6,427,479 | B1 | * | 8/2002 | Komatsubara et al. | ........ 62/503 |
| 6,581,404 | B2 | * | 6/2003 | Komatsubara et al. | ........ 62/474 |

FOREIGN PATENT DOCUMENTS

| JP | 08-240362 | 9/1996 |
| JP | 10-002641 | 1/1998 |
| JP | 2962676 | 6/1999 |
| JP | 2000-088403 | 3/2000 |
| JP | 2000-249435 | 9/2000 |

OTHER PUBLICATIONS

International Search Report corresponding to application No. PCT/JP01/11014 dated Apr. 30, 2002.
English translation of Form PCT/ISA/210.

* cited by examiner

Primary Examiner—Denise L. Esquivel
Assistant Examiner—Filip Zec
(74) Attorney, Agent, or Firm—RatnerPrestia

(57) ABSTRACT

To provide a refrigerating cycle apparatus which uses carbon dioxide as a working medium, in which a problem associated with reliability arisen from introduction of water into a refrigeration cycle has been solved.

Carbonic acid produced by a reaction of carbon dioxide or a mixed refrigerant including carbon dioxide and water is efficiently removed by providing a flow channel of the refrigeration cycle with a carbonic acid trapping agent, and consequently, the refrigerating cycle apparatus with high reliability which can prevent deterioration of a carbon dioxide refrigerant, decomposition of a refrigeration oil, corrosion of metal components or the like is constructed.

15 Claims, 3 Drawing Sheets

REFRIGERATING CYCLE APPARATUS AND METHOD

This Application is a U.S. National Phase Application of PCT International Application PCT/JP01/11014.

TECHNICAL FIELD

The present invention relates to a refrigerating cycle apparatus which uses carbon dioxide as a refrigerant and is used for an air conditioner, a car air-conditioner, an electric refrigerator (freezer), a show case, a refrigerated warehouse or a cold storage warehouse, a heat pump-type hot water supplier or the like.

BACKGROUND ART

In a refrigerating cycle apparatus comprising a compressor, a cooler, an expansion device, an evaporator or the like as main components, hydrocarbon which contains fluorine atoms has been conventionally used as a refrigerant.

In particular, hydrocarbons which contain chlorine atoms as well as fluorine atoms have been used for many years as nonflammable and highly efficient refrigerators, but it has become apparent that some of the refrigerants such as CFCs (chlorofluorocarbons) or HCFCs (hydrochlorofluorocarbons) will deplete an ozone layer when such refrigerant is released into the atmosphere and penetrates to the stratosphere, because the refrigerant contains chlorine atoms. For this reason, the use of CFCs or HCFCs has recently been prohibited or restricted on a worldwide basis.

HFC (hydrofluorocarbon) which does not contain chlorine atoms has been used instead of the above described refrigerants. However, the HFC has a high global warming potential because the HFC has a long lifetime which lasts until the HFC decomposes into ions or atoms in the atmosphere, though the HFC does not have a property of depleting the ozone layer. Therefore, the profound greenhouse effect will be provided if the HFC is released into the atmosphere, so that the HFC is not necessarily a satisfactory refrigerant in terms of preventing the global warming which has become a problem recently.

Instead of the above described hydrocarbons containing halogen atoms, it has been suggested that carbon dioxide is used as a refrigerant whose ozone depleting potential is zero and whose global warming potential is also very low. Development of equipment which uses carbon dioxide as a refrigerant has been advanced for practically using such equipment in a large-sized freezer for commercial use, but as for relatively small-sized equipment intended for home use or for vehicle installation, it is still in a starting stage of studying the availability of such equipment. In case of using carbon dioxide as a refrigerant, the global warming potential of such refrigerant per se is very low, so that an energy-saving technology which improves an efficiency of the whole system by making use of such refrigerant as a working medium has been developed. In addition, studies on reliability of materials and instruments, which might be a matter of concern when carbon dioxide is newly used as a refrigerant, are now carried out.

According to these studies, when carbon dioxide is used as a refrigerant, a refrigeration cycle is configured by allowing a carbon dioxide refrigerant to work at high pressure relative to the HFC refrigerant and by making the carbon dioxide refrigerant into a fluid in a supercritical state. Carbon dioxide as a supercritical fluid has certain properties such as high permeability to other materials and a profound solvent effect on substance transportation, unlike properties of a liquid or a gas, so that it is necessary to pay attention for selecting a material to be used for each of the components which comprise the refrigerating cycle apparatus.

With respect to the reliability, it is necessary to clarify the compatibility of the refrigerant itself with the materials which are used for the apparatus and an influence on a lubricating property or the like of a refrigeration oil which is used as a lubricating oil of a compressor. In particular, water which is introduced to a refrigerating cycle apparatus comprising a compressor, a cooler, an expansion device, an evaporator or the like as main components may cause hydrolysis to decompose the refrigeration oil, or may cause corrosion of metal materials which are used for a motor of the compressor and used for each of configuration means of the refrigerating cycle apparatus, or may cause electric insulation to organic materials; therefore when the refrigeration cycle is configured by the use of a new refrigerant, it is necessary to sufficiently conduct studies on the water which may become factors in adversely affecting the reliability.

For example, when the HFC refrigerant is used as a working medium, the refrigerant itself has a polarity and a refrigeration oil which is compatible with the refrigerant and which has a relatively large polarity is suitable for use with the refrigerant, so that the water can be easily introduced to the refrigerating cycle apparatus.

As a measure against the above described problem, a refrigeration cycle equipped with a dryer for drying, for example, is disclosed in Japanese Patent No. 2962676 or the like. On the other hand, when carbon dioxide is used as a working medium, the polarity of carbon dioxide is small as a refrigerant, so that introduction of water is believed to be less than the case of using the HFC refrigerant.

However, when carbon dioxide is used as a refrigerant of the working medium, studies on an influence of the water included in the refrigerant which has been introduced into the refrigerating cycle apparatus is not sufficiently conducted at present stage.

In addition, when a refrigeration oil is charged into the compressor as a lubricating oil, a large amount of water is introduced to carbon dioxide as a working medium by the refrigeration oil, so that it is necessary to sufficiently study the reliability of the refrigerating cycle apparatus as for such problems.

As one of the measures, it has been suggested that the refrigerating cycle apparatus is provided with a desiccant such as molecular sieve or silica gel as a dryer, as in the case of the HFC refrigerant.

However, as for the reliability of the refrigerating cycle apparatus which uses carbon dioxide as a working medium, problems as described below become apparent while pursuing the above described studies.

That is, it has become apparent that carbon dioxide as a refrigerant and water introduced in the refrigeration system react with each other to produce carbonic acid, and consequently, the carbonic acid circulates within the refrigerating cycle apparatus and the materials constituting the refrigeration system are easily corroded, so that the reliability of this apparatus are liable to be adversely affected as follows.

For example, oxidation and corrosion will be easily promoted by decomposition of organic materials used for each of configuration means of a motor material used in the compressor, acid decomposition of the refrigeration oil, corrosion of the metal materials, and acidification of the atmosphere caused by the decrease in pH of the working medium within the refrigeration system.

For this reason, it is feared that a lubricating property of the compressor may be degraded or blocking phenomenon may occur due to the out flow of reaction products into the refrigerating cycle apparatus. In particular, when a refrigeration oil whose main component is a polar oil is used as a working medium, the refrigeration oil may be easily decomposed under the influence of the carbonic acid, so that certain measures are required.

In addition, when a desiccant such as molecular sieve conventionally used for removing water within the refrigerating cycle apparatus containing the HFC refrigerant is used, carbon dioxide as well as water are adsorbed by the desiccant, so that an efficiency of removing water is reduced. In this case, carbonic acid is also adsorbed, but its adsorption is not so efficient.

This is because the water and carbon dioxide are firstly adsorbed by the desiccant, and consequently, it becomes difficult to remove the carbonic acid. For this reason, the inventors have searched for a new material for trapping carbonic acid in order to efficiently remove the carbonic acid which has been produced within the refrigerating cycle apparatus and have suggested a refrigeration cycle configuration for efficiently using the carbonic trapping materials, consequently, it has become apparent to require to take some measures against such problems.

DISCLOSURE OF THE INVENTION

In view of the above described problems of prior art, an object of the present invention is to provide a refrigerating cycle apparatus an method which has solved the reliability problems caused by introduction of water to a refrigeration cycle in case of using carbon dioxide as a refrigerant of a working medium. In other words, an object of the present invention is to provide a refrigerating cycle apparatus with high reliability by efficiently removing carbonic acid, which has been produced by a reaction of carbon dioxide as a refrigerant and water, from a refrigeration cycle.

A refrigerating cycle apparatus of the present invention which solves the above conventional problems, is characterized by comprising: a compressor for compressing a working medium; a cooler for cooling said working medium; an expansion device for decompressing said working medium; and an evaporator for vaporizing said working medium, wherein said working medium includes carbon dioxide or a mixed refrigerant containing carbon dioxide, and a flow channel of said working medium is provided with a carbonic acid trapping agent for trapping carbonic acid.

Further, the present invention is characterized by that said carbonic acid trapping agent is provided to the flow channel of said working medium where a temperature of said working medium is less than a critical temperature.

Further, the present invention is characterized by comprising a flow channel switching device and method for switching the flow channel of said working medium to another flow channel, wherein said carbonic acid trapping agent is provided between said flow channel switching device and an intake portion of said compressor.

Further, the present invention is characterized by that a refrigeration oil whose main component is a polar oil is contained within said compressor or said refrigeration cycle.

Further, the present invention is characterized by that said carbonic acid trapping agent is at least any of alkali metal aluminosilicates or metal aluminosilicates obtained by ion exchange of alkali metal ions of alkali metal aluminosilicates for other cations.

Further, the present invention is characterized by that said carbonic acid trapping agent has a pore size of 0.35 nm or less.

Further, the present invention is characterized by that said carbonic acid trapping agent is at least any of potassium aluminosilicate, sodium potassium aluminosilicate obtained by ion exchange of 20% or more of sodium ions of sodium aluminosilicate for potassium ions, or sodium cesium aluminosilicate obtained by ion exchange of 10% or more of sodium ions of sodium aluminosilicate for cesium ions.

Further, the present invention is characterized by that said carbonic acid trapping agent includes at least any of alkali metal oxides, alkali earth metal oxides, alkali metal carbonates, and alkali earth metal carbonates.

Further, the present invention is characterized by that said carbonic acid trapping agent is a porous body a particulate body having an amino group.

DESCRIPTION OF SYMBOLS

Figure 1:
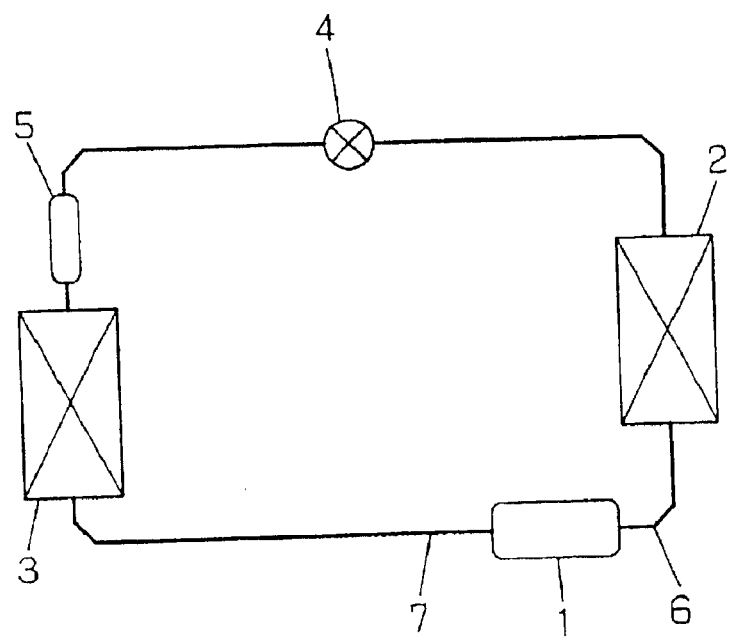
FIG. 1 is a block diagram of a refrigerating cycle apparatus according to Embodiment 1 of the present invention.

1 Compressor
2 Cooler
3 Evaporator
4 Expansion device
5 Carbonic acid trapping agent-charged container
6 Discharge side piping of a compressor
7 Suction side piping of a compressor
11 Compressor
12a, 12b Heat exchanger
13 Expansion device
14 Carbonic acid trapping agent-charged container
15 Flow channel switching means (four-way valve)
16 Piping at a low temperature side
17 Outdoor unit
18 Indoor unit
19a Discharge side piping of a compressor
19b Suction side piping of a compressor
21 Compressor
22 Cooler
23 Evaporator
24 Expansion device
25 Carbonic acid trapping agent-charged container
26 Internal heat exchanger
27 Piping at a low temperature side
28a Discharge side piping of a compressor
28b Suction side piping of a compressor

BEST MODE FOR CARRYING OUT THE INVENTION

A refrigerating cycle apparatus of the present invention comprises at least a compressor for compressing a working medium, a cooler for cooling the working medium, an expansion device for decompressing the working medium, and an evaporator for vaporizing the working medium, the working medium being predominantly consisting of a carbon dioxide refrigerant.

Effects of the present invention can be produced not only in case of using carbon dioxide as the working medium but also in case of using a mixed refrigerant including carbon dioxide. As the mixed refrigerant, a composition which is obtained by mixing an HFC refrigerant such as HFC134a (1,1,1,2-tetrafluoroethane) or HFC32 (difluoromethane), or a hydrocarbon refrigerant such as ethane, propane, butane, or isobutane with a carbon dioxide refrigerant as appropriate is applicable.

Carbon dioxide is a refrigerant which has a low polarity, but which has a relatively high affinity for water and is liable to occlude a small amount of water if any, so that water is easily introduced to a refrigeration cycle. And the mixed refrigerant containing carbon dioxide, which also contains the HFC refrigerant, has a polarity, so that water is easily introduced to the refrigeration cycle. Thus, if the water has been introduced to the refrigerating cycle apparatus, carbon dioxide and water produce carbonic acid as represented by (Formula 1).

$$H_2O + CO_2 \leftrightarrows H_2CO_3 \quad \text{(Formula 1)}$$

The carbonic acid, which is ionized to a hydrogen ion and a hydrogen carbonate ion, makes an atmosphere within the refrigeration cycle acidic. This acidic atmosphere attacks components which configure the refrigeration cycle such as metal materials, organic materials, and a refrigeration oil as a working medium, so that the reliability of the refrigerating cycle apparatus becomes lower.

The refrigerating cycle apparatus is characterized in that a flow channel of the working medium within the refrigeration cycle is provided with a carbonic acid trapping agent, in order to solve the problem which is caused by carbonic acid produced by the introduction of water, and is further characterized by a construction of the refrigerating cycle apparatus for allowing the carbonic acid trapping agent to effectively work.

Now, the carbonic acid trapping agent which is effective for the present invention will be described, and then the configuration of the refrigeration cycle which can produce the effects will be described.

Firstly, the carbonic acid trapping agent used for the present invention will be described.

As a result of searching through many materials with a particular emphasis on the generally known carbon dioxide immobilized materials as a carbonic acid trapping agent of the present invention and studying the searched materials, the materials described below were effective for trapping carbonic acid within a carbon dioxide refrigerant:

(1) at least any material of alkali metal aluminosilicates or metal aluminosilicates obtained by ion exchange of alkali metal ions of alkali metal aluminosilicates for other cations;

(2) at least any material of alkali metal oxides, alkali earth metal oxides, alkali metal carbonates, and alkali earth metal carbonates; and (3) porous or particulate materials having amino groups.

These carbonic acid trapping agents will be described in sequence.

Firstly, as for any material of alkali metal aluminosilicates or metal aluminosilicates obtained by ion exchange of alkali metal ions of alkali metal aluminosilicates for other cations as described in (1), it has been recognized that these materials exhibited a certain effect as a result of studying a zeolite material such as molecular sieve. The alkali metal aluminosilicates had alkali metals such as sodium, potassium, and lithium.

In addition, cations of metal aluminosilicates obtained by ion exchange of alkali metal ions of alkali metal aluminosilicates for other cations were alkali metal ions such as sodium, potassium, or lithium ions and alkali earth metal ions such as calcium, barium, or cesium ions.

In particular, among these materials, potassium aluminosilicate, sodium potassium aluminosilicate obtained by ion exchange of 20% or more of sodium ions of sodium aluminosilicate for potassium ions, or sodium cesium aluminosilicate obtained by ion exchange of 10% or more of sodium ions of sodium aluminosilicate for cesium ions was able to be effectively used.

For example, a zeolite compound having a pore size of about 0.35 nm or less such as 3A-type zeolite, a compound obtained by ion exchange of 20% or more of 4A-type sodium aluminosilicate for potassium ions, or a compound obtained by ion exchange of 10% or more of the 4A-type for cesium ions was able to produce a certain effect.

It can be considered that the carbonic acid is adsorbed through a reaction represented by (Formula 2), for example,

$$K_2O \cdot AS + H_2CO_3 + CO_2 \leftrightarrows 2[K^+ \cdot (HCO_3^-)] \cdot AS \quad \text{(Formula 2)}$$

wherein AS is an aluminosilicate skeleton.

The reason why the above described metal aluminosilicates were effective for trapping carbonic acid within the carbon dioxide refrigerant is considered that carbon dioxide is difficult to be adsorbed by the effective metal aluminosilicate having a pore size of about 0.35 nm or less which is probably equal to or less than the molecular diameter of carbon dioxide.

On the other hand, as for an alkali earth metal aluminosilicate having a pore size more than 0.35 nm, for example other than the above described materials, it has been inferred that a large amount of carbon dioxide being present as a refrigerant in an atmosphere has been firstly adsorbed by an adsorption site of the metal aluminosilicates before carbonic acid being absorbed, so that an effect of adsorbing carbonic acid could not be produced.

In addition, as for the effective metal aluminosilicates, carbonic acid has difficulty in approaching into the pore at an adsorption site of the above described metal aluminosilicates because the carbonic acid has a large molecular diameter, so that the adsorption of the carbonic acid is probably carried out in proximity of the opening of the pore.

In order to demonstrate the difference between the effects of trapping carbonic acids which depend on such pore sizes, experiments as follows were conducted.

Two autoclaves which were respectively charged with two different liquefied carbon dioxides respectively prepared with 1000 ppm by weight of water and 50 ppm by weight of water, to both of which the same metal aluminosilicates were added, were treated at 150° C. or higher for 10 days or more, then the metal aluminosilicates were removed from the autoclaves, and respective metal aluminosilicates were heated by means of a thermal desorption gas analyzer to produce water and carbon dioxide, and further the amounts of the water and carbon dioxide were measured and compared with each other to make evaluation of them.

As the metal aluminosilicates to be evaluated, calcium aluminosilicate whose pore size was more than 0.35 nm (Ca-X type zeolite) and potassium aluminosilicate whose pore size was less than 0.35 nm (K-A type zeolite) were used. These metal aluminosilicates were added to the above described autoclaves which were respectively conditioned by two kinds of water contents. Carbon dioxide produced by the thermal desorption analyzing test is supposed to be generated by decomposition of the trapped carbonic acid and to be generated by desorption of the adsorbed carbon dioxide.

Consequently, in the case of calcium aluminosilicate, substantially the same amount of carbon dioxide was produced in either condition in which an amount of water was different from the other. This is believed that the carbonic acid has been hardly trapped because of its independence of water content but carbon dioxide is adsorbed. On the other hand, in the case of potassium aluminosilicate, an amount of carbon dioxide which was produced under the condition including 1000 ppm by weight of water was larger than that produced under the condition including 50 ppm by weight of water. That is, the reason why the amount of carbon dioxide produced by the thermal desorption in a water-rich atmosphere was larger than the other is considered that a small amount of carbon dioxide is adsorbed and the aluminosilicate traps the carbonic acid produced by the water. From a study as described above, it can be said that the aluminosilicate whose pore size is smaller has a better carbonic trapping effect.

Next, an effect of (2) at least any materials of alkali metal oxides, alkali earth metal oxides, alkali metal carbonate, and alkali earth metal carbonate will be described. As an alkali metal, a compound such as sodium, potassium, or lithium was able to be used, and as alkali earth metal, a compound such as calcium, barium, or cesium was able to be used.

Alkali metal oxides or alkali earth metal oxides have generally been said to form metal carbonates as a stabilizing agent of carbon dioxide, so that it has been believed that alkali metal oxides and alkali earth metal oxides can not be used as a carbonic acid trapping agent because these oxides will react with carbon dioxide within a carbon dioxide refrigerant. However, in fact, the reaction with carbon dioxide was substantially limited, and an effect of removing carbonic acid was able to be produced.

This is because alkali metal oxides or alkali earth metal oxides are supposed to be subjected to a reaction after carbon dioxide is converted to carbonic acid mediated by water. That is, it has been presumed that the trapping effect was able to be obtained after the reaction with carbonic acid to produce a metal hydrogen carbonate as represented in (Formula 3),

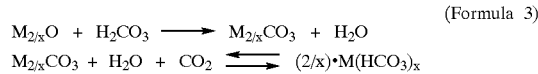

(Formula 3)

wherein x is a valence of the metal ion M.

In addition, in the case of alkali metal carbonates and alkali earth metal carbonates, they react with carbon dioxide in the presence of water to form a metal hydrogen carbonate, so that they have an effect of removing water, and further, they also have an effect of being able to trap the carbonic acid which has been produced by water within the carbon dioxide refrigerant as represented by (Formula 4),

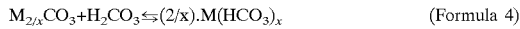

(Formula 4)

wherein x is a valence of the metal ion M.

Next, (3) porous or particulate materials having amino groups will be described. A material obtained by treating a surface of a porous body of an oxide such as alumina or silica gel to form amino groups on the surface, or active carbon subjected to the surface treatment, or beads of polymeric material having amino groups, for example, are used. As a method of surface treatment, a method in which adsorption on the surface of the porous body is performed by means of alkanol amines such as ethanol amine or amino silane compounds such as γ-aminopropyltrimethoxysilane or γ-(2-aminoethyl)aminopropyltrimethoxysilane is typically used.

In addition, as a polymer having amino groups, a polymeric material such as polyallylamine or polyacrylamide can be used. These materials can produce a removal effect by allowing the amino groups to trap carbonic acid as represented by (Formula 5).

Also, the amino groups absorb carbon dioxide in the presence of water, so that it is believed that carbon dioxide does not interfere with trapping of carbonic acid within an atmosphere containing a refrigerant whose water content is lower.

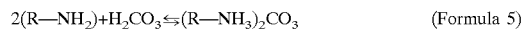

(Formula 5)

wherein R is a structure entity having an amino group.

The carbonic acid trapping agent described above is preferably used by being charged into a container and then by providing the container on a flow channel of the working medium. As for a shape of the carbonic acid trapping agent, particulate trapping agent is used in order to suppress the flowing resistance of the refrigerant, and as a method of charging into the container, the trapping agent may be immobilized within the container by the use of a holding member such as a mesh-like member.

Now, specific preferred embodiments of the present invention will be described with reference to the drawings.

(Embodiment 1)

FIG. 1 is a block diagram of a refrigerating cycle apparatus according to Embodiment 1 of the present invention and this apparatus is configured by connecting, with piping, a compressor 1, a cooler 2, an expansion device 4 such as a capillary tube or an expansion valve, and an evaporator 3.

This refrigerating cycle apparatus is configured by charging carbon dioxide to this apparatus as a refrigerant of a working medium, and by also charging a refrigeration oil to this apparatus as required. In order to remove carbonic acid which has been produced by introducing water to the working medium within this refrigeration cycle, a carbonic acid trapping agent-charged container 5 to which a carbonic acid trapping agent is charged is connected to the refrigeration cycle with the piping, so that the reliability of the refrigeration cycle is ensured.

Next, a flow of the carbon dioxide refrigerant within the refrigerating cycle apparatus will be described. The carbon dioxide refrigerant which has been compressed by the compressor 1 becomes a fluid in a supercritical state and flows through a discharge side piping 6 to the cooler 2 where the refrigerant generates heat, and further flows through the expansion device 4 in the supercritical state in which a temperature of the refrigerant is lowered to about its critical temperature. At this stage, the refrigerant becomes a gas-liquid mixing state whose temperature is less than the critical temperature and undergoes endothermic vaporization within the evaporator 3, then the vaporized refrigerant flows through a suction side piping 7 to be sucked again by the compressor 1. This is a refrigeration cycle of Embodiment 1. Within this refrigeration cycle, the carbonic acid trapping agent-charged container 5 will be placed.

More preferably, in the present invention, the container is provided at a position in which a temperature of the working medium becomes less than a critical temperature of carbon dioxide within the refrigeration cycle, in order to allow the carbonic acid trapping agent to work more effectively. The reason why doing so will be described below.

Carbon dioxide which is in a liquid state has a low polarity, but carbon dioxide which is in a supercritical state becomes almost a non-polar state. Therefore, carbonic acid produced by introduction of water which is in a supercritical state is not relatively reactive because the carbonic acid exists as $H_2CO_3$ in a non-ionic state, while the carbon acid which is in a non-supercritical liquid state becomes reactive because a proportion of ionized $H^+.HCO_3^-$ becomes larger. Thus the removal of carbonic acid through reactive adsorption is easily conducted when the carbonic acid trapping agent is provided at a position in which a temperature of the working medium becomes less than the critical temperature of carbon dioxide.

In addition, carbonic acid whose temperature is lower is more easily removed because production of carbonic acid is conducted by an equilibrium reaction as represented by (Formula 1), and the carbonic trapping agent whose temperature is lower retains its trapping state with more stability as represented from (Formula 2) to (Formula 5), so that it is effective to place the container at a certain position within the refrigeration cycle where the temperature is kept less than the critical temperature.

Therefore, in the configuration of the refrigerating cycle apparatus illustrated in FIG. 1, it is effective that the container is placed between the expansion device 4 and the suction side piping 7 of the compressor, and this figure shows that the carbonic acid trapping agent-charged container 5 is placed between the expansion device 4 and the evaporator 3.

(Embodiment 2)

Figure 2:
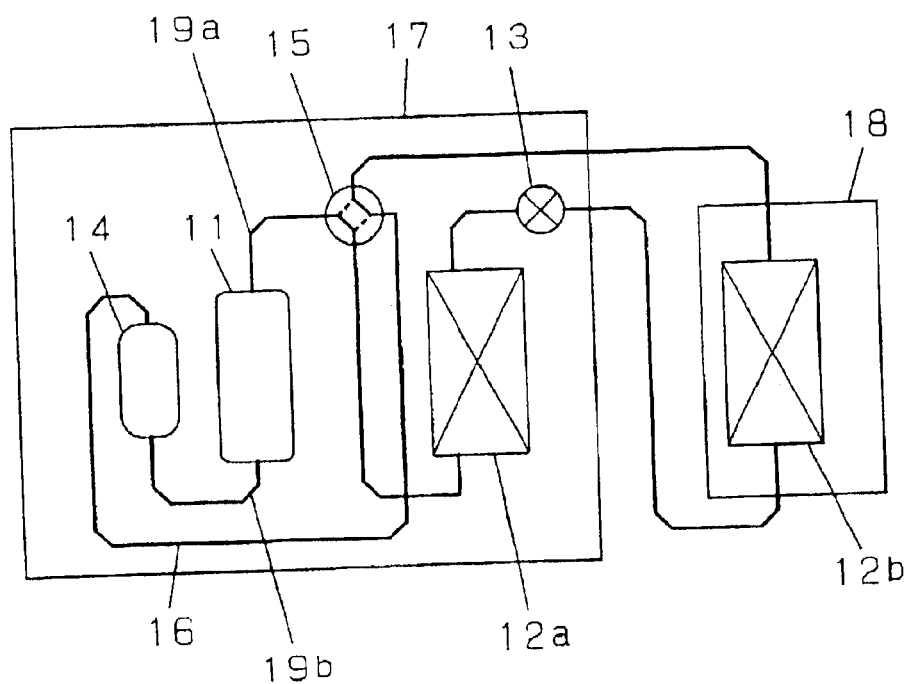
FIG. 2 is a block diagram of a refrigerating cycle apparatus according to Embodiment 2 of the present invention.

FIG. 2 is a block diagram of a refrigerating cycle apparatus according to Embodiment 2 of the present invention, and its refrigeration cycle is configured by connecting an outdoor unit 17 having a compressor 11, a heat exchanger 12a, an expansion device 13 such as a capillary tube or an expansion valve, and piping for connecting these components and an indoor unit 18 having a heat exchanger 12b placed at a site in which air-conditioning is performed, by means of connecting pipes.

Since the outdoor unit 17 of FIG. 2 has a flow channel switching means 15 such as a four-way valve, the heat exchangers 12a, 12b can function alternately as a cooler and as an evaporator.

In order to remove carbonic acid which has been produced by introduction of water, a carbonic acid trapping agent-charged container 14 is placed at a low temperature side piping 16 between the flow channel switching means 15 and a suction side of the compressor 11.

A flow of a carbon dioxide refrigerant within this refrigerating cycle apparatus, in case of performing air-cooling, forms a cycle such that the refrigerant which is compressed by the compressor 11 and becomes a supercritical state generates heat at the heat exchanger 12a which functions as a cooler and flows through the expansion device 13 to become a gas-liquid mixing state which is at a low temperature and then undergoes endothermic vaporization at a heat exchanger 12b which functions as an evaporator in the indoor unit 18 and is finally sucked again into the compressor 11.

In case of heating, the refrigerant cycle is formed such that the flow channel is switched to another channel by rotation of the four-way valve 15, and the refrigerant is cooled by the heat exchanger 12b which functions as a cooler and evaporates at a the heat exchanger 12a which functions as an evaporator.

At a position where the carbonic acid trapping agent-charged container 14 is placed, a temperature of carbon dioxide refrigerant is always less than the critical temperature independent of the functional switching of the heat exchangers conducted by switching the flow channels, so that the trapping of carbonic acid can be effectively performed and the reliability of the refrigeration cycle is ensured.

At other positions, a temperature of the working medium may reach to a high temperature equivalent to a critical temperature or more of carbon dioxide depending on the functional switching, and carbonic acid trapped by the carbonic acid trapping agent may be released again into the cycle.

Also, structure of the carbonic acid trapping agent-charged container 14 shown in FIG. 2 may be a structure of an accumulator for subjecting the refrigerant to the liquid separation, to which the carbonic acid trapping agent is charged.

(Embodiment 3)

Figure 3:
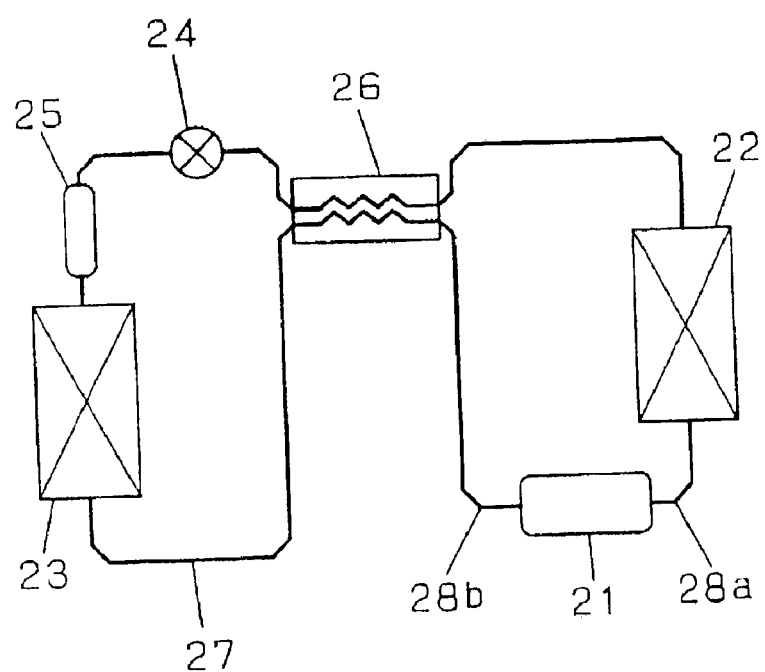
FIG. 3 is a block diagram of a refrigerating cycle apparatus according to Embodiment 3 of the present invention.

FIG. 3 is a block diagram of a refrigerating cycle apparatus according to Embodiment 3 of the present invention, and the apparatus is configured by connecting, with piping, a compressor 21, a cooler 22, an expansion device 24 such as a capillary tube or an expansion valve, and an evaporator 23. This refrigerating cycle apparatus is provided with an internal heat exchanger 26 for performing heat exchange between a high-pressure side and a low-pressure side of this cycle in order to improve the efficiency by lowering a temperature upstream of the expansion device 24.

A flow of the carbon dioxide refrigerant within this refrigeration apparatus forms a low temperature cycle such that the refrigerant which has been compressed by the compressor 21 to become a supercritical state generates heat at the cooler 22, and the refrigerant is further cooled by the internal heat exchanger 26 followed by allowing the cooled refrigerant to flow through the expansion device 24. The subsequent cycle is formed such that the refrigerant undergoes endothermic vaporization at the evaporator 23 and flows through the internal heat exchanger 26 to be sucked again into the compressor 21.

A position where the carbonic acid trapping agent-charged container 25 is placed in FIG. 3 is at an evaporator side of the internal heat exchanger 26 which is within a cycle where a temperature of the carbon dioxide refrigerant is lowered to a certain temperature less than its critical temperature within the flowing channel, and in this embodiment, the cycle is configured by providing the container 25 between the expansion device 24 and the evaporator 23.

Although three specific embodiments of the refrigerating cycle apparatus according to the present invention have been described above, a configuration of the refrigerating cycle apparatus which uses a carbon dioxide refrigerant as a working medium is not limited to these embodiments.

A position where the carbonic acid trapping agent-charged container is provided is not also limited to the configurations described in the above embodiments. It has been described that the carbonic acid trapping agent-charged container is more preferably placed at a position in which a temperature of the working medium within the refrigeration cycle is less than a critical temperature of carbon dioxide, but in the present invention, the container may also be placed downstream of the heat exchanger which has a function as a cooler for cooling within a flow channel of the refrigeration cycle.

In addition, in the case where a large amount of water is introduced into the refrigerating cycle apparatus, it is effective to provide a dryer to which a desiccant is charged as required. That is, this is because the carbonic acid trapping agent may be possibly inactivated if a large amount of water is introduced to the refrigeration cycle since the carbonic acid trapping agent used in the present invention has a property of adsorbing the water or reacts with carbon dioxide mediated by the water, although the trapping agent is effective if a small amount of water is introduced into the refrigeration cycle.

In addition, the refrigerating cycle apparatus of the present invention is charged with carbon dioxide as a refrigerant of the working medium and is configured by filling a refrigeration oil into the compressor as required. The refrigeration oil is for ensuring a lubricating property at a sliding portion of the compressor.

The refrigeration oil includes non-polar oils and polar oils, and for example, the non-polar oils include mineral oils, poly-α-olefine oils, alkylbenzene oils, and a mixture thereof, and the polar oils include polyolester oils, polyvinyl ether oils, polyalkylene glycol oils, polycarbonate oils and a mixture thereof, and also include mixed oils of the non-polar oils and the polar oils.

When the refrigeration oil is used with a carbon dioxide refrigerant as a working medium of the refrigerating cycle apparatus of the present invention, any of refrigeration oils can be used in terms of its lubrication property. Considering disadvantages caused by introducing water into the refrigeration cycle, the non-polar oils represented by the mineral oils and the poly-α-olefine oils are preferably used. However, the refrigeration oil in the refrigerating cycle apparatus essentially works inside the compressor, and it has been known that a portion of the refrigeration oil together with a compressed refrigerant vapor circulate in the refrigerating cycle apparatus. From these points, considering the properties such as compatibility between the refrigerant and the refrigeration oil, the polar oils represented by the polyol ester oils, polyalkylene glycol oils and polycarbonate oils are required to be selected.

In the case where the polar oil is used as a refrigerant oil, water is easily introduced to the refrigerating cycle apparatus due to an affinity between the refrigeration oil and water. This water has a possibility of deteriorating the reliability of the refrigerating cycle apparatus because the water reacts with the carbon dioxide refrigerant to produce carbonic acid and then hydrolysis of the refrigeration oil itself is facilitated due to the produced carbonic acid.

Therefore, the effect produced by providing the flow channel of the refrigeration cycle with the carbonic acid trapping agent according to the present invention becomes more remarkable when these polar oils are used as working media.

In particular, the polyalkylene glycol oil which is suited for the refrigeration oil in the refrigerating cycle apparatus utilizing the carbon dioxide refrigerant has a possibility of blocking the refrigeration cycle due to alcohol obtained by decomposition of this oil, so that the configuration of the present invention provides a beneficial effect.

In addition, each system such as reciprocating, rotary, scrolling, or linear system is adaptable to a system of compressing the working medium by the compressor.

INDUSTRIAL APPLICABILITY

As apparent from the above description, the present invention provides a refrigerating cycle apparatus which uses carbon dioxide as a refrigerant of a working medium, in which problems associated with reliability arisen from introduction of water to a refrigeration cycle are solved.

In other words, the present invention can efficiently remove carbonic acid by providing a carbonic acid trapping agent to a flow channel of the working medium of the refrigeration cycle, the carbonic acid having been produced by a reaction between carbon dioxide as a refrigerant and water. Consequently, a refrigerating cycle apparatus with high reliability which can prevent degradation of the carbon dioxide refrigerant, decomposition of the refrigeration oil, corrosion of the metal components or the like is provided, therefore, this apparatus has great value in its industrial practice.

What is claimed is:

1. A refrigerating cycle apparatus, comprising:
   a compressor for compressing a working medium;
   a cooler for cooling said working medium;
   an expansion device for decompressing said working medium;
   a flow channel for said working medium;
   a carbonic acid trapping agent-charged container connected to said flow channel; and
   an evaporator for vaporizing said working medium,
   wherein:
   said working medium comprises carbon dioxide or a mixed refrigerant comprising carbon dioxide, and
   the carbonic acid trapping agent-charged container comprises a particulate carbonic acid trapping agent for trapping carbonic acid.

2. The refrigerating cycle apparatus according to claim 1, wherein said carbonic acid trapping agent is provided to the flow channel of said working medium where a temperature of said working medium is less than a critical temperature.

3. The refrigerating cycle apparatus according to claim 1, further comprising a flow channel switching device for switching the flow channel of said working medium to another flow channel, wherein said carbonic acid trapping agent is provided between said flow channel switching device and an intake portion of said compressor.

4. The refrigerating cycle apparatus according to any one of claims 1 to 3, wherein a refrigeration oil whose main component is a polar oil is contained within said compressor or said refrigeration cycle.

5. The refrigerating cycle apparatus according to any one of claims 1 to 3, wherein said carbonic acid trapping agent is at least any of alkali metal aluminosilicates or metal aluminosilicates obtained by ion exchange of alkali metal ions of alkali metal aluminosilicates for other cations.

6. The refrigerating cycle apparatus according to any one of claims 1 to 3, wherein said carbonic acid trapping agent has a pore size of 0.35 nm or less.

7. The refrigerating cycle apparatus according to claim 5, wherein said carbonic acid trapping agent is at least any of potassium aluminosilicate, sodium potassium aluminosilicate obtained by ion exchange of 20% or more of sodium ions of sodium aluminosilicate for potassium ions, or sodium cesium aluminosilicate obtained by ion exchange of 10% or more of sodium ions of sodium aluminosilicate for cesium ions.

8. The refrigerating cycle apparatus according to any one of claims 1 to 3, wherein said carbonic acid trapping agent includes at least any of alkali metal oxides, alkali earth metal oxides, alkali metal carbonates, and alkali earth metal carbonates.

9. The refrigerating cycle apparatus according to any one of claims 1 to 3, wherein said carbonic acid trapping agent is a porous body or a particulate body having an amino group.

10. A refrigerating cycle apparatus, said apparatus comprising: a working medium; a compressor for compressing said working medium; a cooler for cooling said working medium; an expansion device for decompressing said working medium; an evaporator for vaporizing said working medium; and a flow channel for said working medium;
    wherein:
    said working medium comprises carbon dioxide;
    said flow channel for said working medium comprises a carbonic acid trapping agent; and said carbonic acid trapping agent is selected from the group consisting of potassium aluminosilicate, sodium potassium aluminosilicate obtained by ion exchange of 20% or more of the sodium ions of sodium aluminosilica for potassium ions, sodium cesium aluminosilicate obtained by ion exchange of 10% or more of the sodium ions of sodium aluminosilicate for cesium ions, and mixtures thereof.

11. The refrigerating cycle apparatus of claim 10, wherein said carbonic acid trapping agent has a pore size of 0.35 nm or less.

12. The refrigerating cycle apparatus of claim 11, wherein said carbonic acid trapping agent is either a porous body or a particulate body, wherein amino groups are present of the surface of said porous body or said particulate body.

13. The refrigerating cycle apparatus of any of claims 10 to 12, wherein said carbonic acid trapping agent additionally comprises an alkali metal oxide, an alkali earth metal oxide, an alkali metal carbonate, an alkali earth metal carbonate, or a mixture thereof.

14. The refrigerating cycle apparatus of claim 13, wherein said working medium is carbon dioxide.

15. The refrigerating cycle apparatus of any of claim 1, 2, 3, or 10, wherein said working medium is carbon dioxide.

* * * * *